W. BARRON.
Field-Marker.
No. 226,697.                    Patented April 20, 1880.
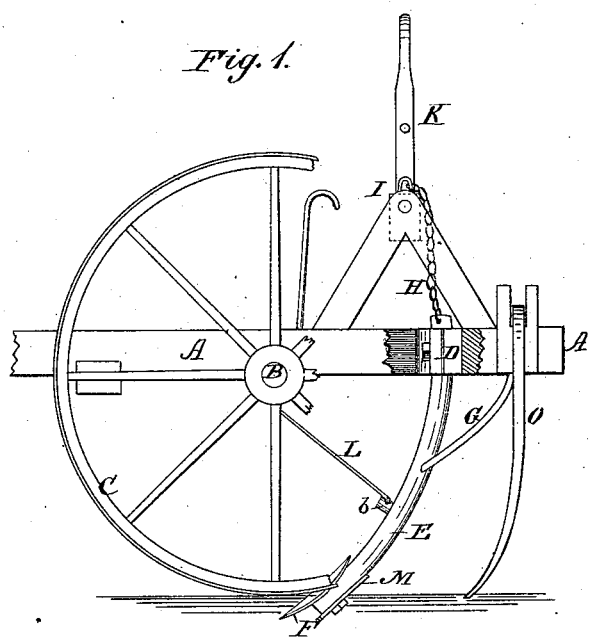
Fig. 1.
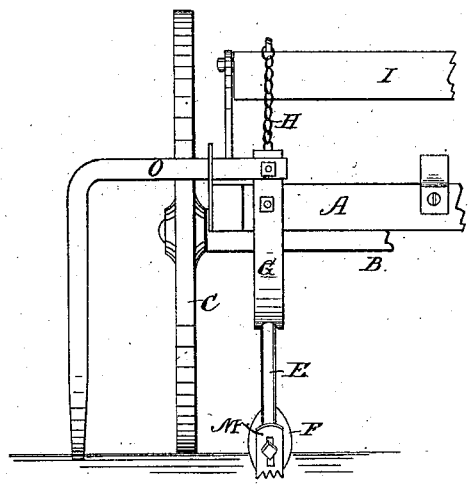
Fig. 2.
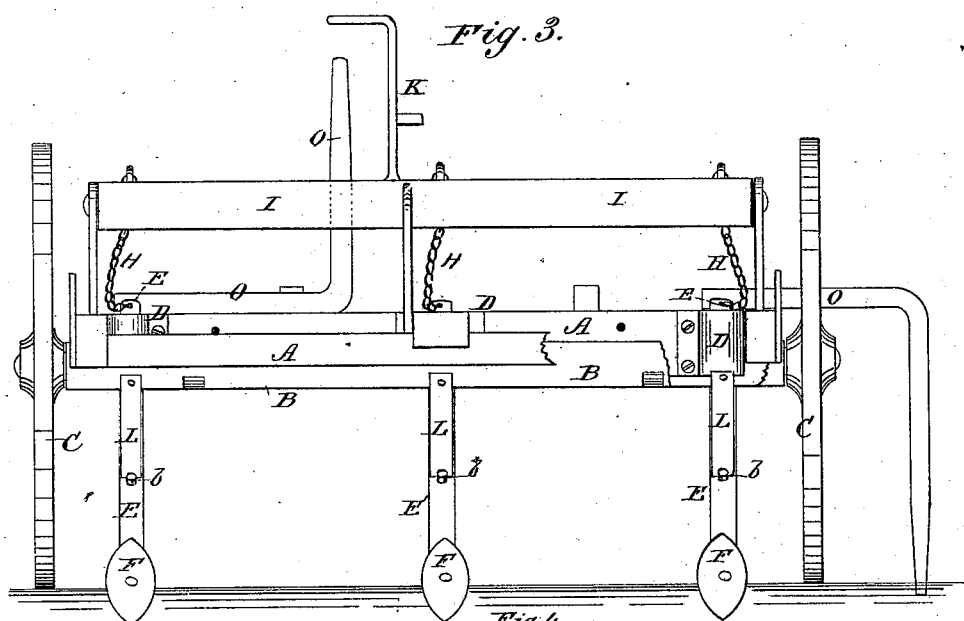
Fig. 3.
Fig. 4.
WITNESSES:
W. W. Hollingsworth
Amos W. Hart
INVENTOR:
W. Barron
BY
ATTORNEYS.

UNITED STATES PATENT OFFICE.

WASHINGTON BARRON, OF SUMMIT BRIDGE, DELAWARE.

FIELD-MARKER.

SPECIFICATION forming part of Letters Patent No. 226,697, dated April 20, 1880.

Application filed September 26, 1879.

*To all whom it may concern:*

Be it known that I, WASHINGTON BARRON, of Summit Bridge, in the county of New Castle and State of Delaware, have invented a new and useful Improvement in Field-Markers; and I do hereby declare that the following is a full, clear, and exact description of the same.

My invention relates to an improved implement or machine for running slight furrows in plowed land as marks for planting corn or other seed, or for crossing out land for planting an orchard, &c.

The features of construction embodying my improvements are as hereinafter described, reference being had to the accompanying drawings, in which—

Figure 1 is an end view of my machine, certain parts being broken away to better show the construction. Fig. 2 is a rear view of one end of the machine. Fig. 3 is a front view, part of the frame being broken away. Fig. 4 is a diagram illustrating the tracks or furrows made by the shovels, wheel, and marker-bar.

The rectangular oblong frame A of the machine is mounted on and rigidly secured to the axle B of the transporting-wheels C. To the front side of the rear bar of such frame A are attached three boxes, D, in each of which slides a curved standard, E or E', carrying a working tooth or shovel, F. To the rear side of such rear bar of the frame A are attached three braces, G, each of which is located directly behind a standard, E or E', and is curved forward beneath the frame-bar, so that its forked lower end is in contact with or partly embraces such standard. The parts G thus serve as guides as well as braces or supports for the standards. The standards are adapted to slide in their boxes, and the means for raising them simultaneously, so as to take the shovels F out of the soil when not required to work, consist of chains H and a roller or rocking bar, I, provided with a lever, K.

The effect of gravity will ordinarily be sufficient to cause the standards E E' to slide downward and remain in the required position for doing their work effectually; but to prevent them from sticking in their bearings by reason of friction, and also to hold them steadier when in working position, I employ devices which, so to speak, supplement the action of gravity—to wit, the plate-springs L, which are attached fixedly to the axle B, and whose free ends rest on studs or lugs *b* of the standards, as shown in Fig. 1.

The rotary adjustment of the rocker I will obviously control the position of the standards E E', they being raised or lowered more or less according as the rocker is rotated more or less in one direction or the other. By locking the rocker I in any adjustment (by any suitable device) the standards E E' will be similarly held fixed in a corresponding or relative adjustment higher or lower.

I attach to the lower ends or feet of the standards E E' toothed plates or raking devices M, whose function is to dig and loosen the soil at the bottom of the furrows made by the shovels F, thus forming a soft bed, which will prevent the corn when dropped from bounding out of the furrow, and will likewise promote and facilitate the growth and rooting of the plants. The said toothed plates M are attached to the standards by means of bolts directly in rear of the shovels F, and are provided with slots to enable them to be adjusted higher or lower.

In certain other machines of this class the axle is made of such length that when the machine has passed across the field and been turned about, then on the return trip one of the wheels will run in the furrow previously made by the other wheel on the first trip.

To avoid making the axle of so great length, and to thereby render the machine lighter, more compact, and convenient to handle and transport, &c., I adopt the following-described construction and arrangement of parts—that is to say: I hinge an angular marker-bar, O, substantially such as has been heretofore employed, at each end of the frame A, and adapt it to be raised and lowered as required for its function; but the distance between the pendent arm of the marker-bars O and the adjacent wheel relative to the distance between the wheels C and the outer standards, E, is such that when the machine is turned about and makes its return trip the wheel C will run in the furrow made by the marker-bar on the first trip—that is to say, the frame A and axle B are made as short, and the wheels are thus placed as near the standards E as practicable. The pendent arm of the marker-bar O is then placed at a distance from the wheels, which, added to the distance between the wheels and outer standards, E, is equal to the distance between any two standards. This relation of locality or distance is illustrated in Fig. 4. By this construction and arrangement of parts it results that on the return the wheel C run in the mark or furrow made by the marker-bar O on the previous trip instead of running in its own previous track. Thus the wheels make no separate tracks or marks across the field, and no confusion of real and apparent marks can occur.

The distance between the markers E F may be changed at will in order to adapt the machine to make furrows at different distances apart, as required for planting different crops. For this purpose I change the position of the two outer boxes, D, laterally on the rear bar of the frame A, different sets of holes being made in such bar to receive the attaching-screws, as shown in Fig. 3. The braces G of the outer standards, E, are also made similarly adjustable. The braces of the two outer standards, E, project upward above frame A, and the marker-bars O are pivoted thereto, so that both will be adjusted simultaneously and the above-described relation of marker-bar, wheels, and outer standards preserved under any adjustment of the marker.

I am aware plates have been attached to the standards of furrow-openers so as to follow the shovels or plows for the purpose of gaging the depth of the furrows; but such combination of parts I do not claim.

What I claim is—

1. In a field-marker, the combination of the curved standards and the boxes in which the same slide, the devices for raising the standards, and the curved fixed braces whose lower ends bear against and support them in any adjustment, all as shown and described.

2. In a field-marker, the combination of the curved standards and the boxes in which the same slide, the devices for raising the standards, and the plate-springs arranged in front of the latter, and their free ends resting on projecting portions of the same, as shown and described, for the purpose specified.

3. The combination, with the shovel-standards, of the plates M, which are attached thereto and have their lower edges toothed so as to rake or harrow the bottom of the furrow, and thus leave the soil loose, as specified.

The above specification of my invention signed by me this 12th day of September, 1879.

WASHINGTON BARRON.

Witnesses:
  SOLON C. KEMON,
  AMOS W. HART.